United States Patent [19]
Brown et al.

[11] Patent Number: 6,122,289
[45] Date of Patent: Sep. 19, 2000

[54] METHODS, SYSTEMS AND COMPUTER PROGRAM PRODUCTS FOR CONTROLLING DATA FLOW THROUGH A COMMUNICATIONS ADAPTER

[75] Inventors: Patrick G. Brown, Raleigh; Kimi A. Cousins, Apex, both of N.C.; John R. Flanagan, Poughkeepsie, N.Y.; Maurice Isrel, Raleigh, N.C.; Balachandar Rajaraman, Cary, N.C.; Arthur J. Stagg, Raleigh, N.C.; Mooheng Zee, Fishkill, N.Y.

[73] Assignee: International Business Machines Corporation, Armonk, N.Y.

[21] Appl. No.: 08/920,974

[22] Filed: Aug. 29, 1997

[51] Int. Cl.[7] .................................................. H04J 3/16
[52] U.S. Cl. ................................ 370/465; 370/229
[58] Field of Search .................................. 370/229, 230, 370/231, 232, 235, 252, 253, 412, 415, 465; 709/232, 233, 234, 235

[56] References Cited

U.S. PATENT DOCUMENTS

| | | | |
|---|---|---|---|
| 5,455,826 | 10/1995 | Özveren et al. | 370/60 |
| 5,579,312 | 11/1996 | Regache | 370/60.1 |
| 5,583,857 | 12/1996 | Soumiya et al. | 370/233 |
| 5,675,573 | 10/1997 | Karol et al. | 370/230 |
| 5,732,078 | 3/1998 | Arango | 370/355 |
| 5,802,040 | 9/1998 | Park et al. | 370/232 |

*Primary Examiner*—Chi H. Pham
*Assistant Examiner*—Brenda H. Pham
*Attorney, Agent, or Firm*—Myers Bigel Sibley & Sajovec; Jerry W. Herndon

[57] ABSTRACT

Methods, systems (apparatus) and computer program products are provided that control the data rate through a communications adapter having at least one guaranteed bandwidth connection through the communications adapter. The control of the data rate may be accomplished by assigning to guaranteed bandwidth connections, a maximum threshold value proportional to the amount of data to be transmitted through the communications adapter in a time interval to satisfy the guaranteed bandwidth of the connection. Guaranteed bandwidth connections are then limited to this amount of data in a time interval. Furthermore, an outbound data threshold for data sent tot he adapter and a total data threshold for data to or from the adapter may be established and best efforts data not sent to the adapter if either of these thresholds are exceeded within the time interval.

57 Claims, 5 Drawing Sheets

METHODS, SYSTEMS AND COMPUTER PROGRAM PRODUCTS FOR CONTROLLING DATA FLOW THROUGH A COMMUNICATIONS ADAPTER

FIELD OF THE INVENTION

The present invention relates to data processing systems and more particularly to data processing systems utilizing guaranteed bandwidth and best efforts connections to connect to other data processing systems.

BACKGROUND OF THE INVENTION

Data processing systems which allow for multiple concurrent processes have been known for years. For example, multi-user systems employing mainframe computers with remote terminals include IBM VM and MVS systems. These systems allow for multiple processes on a single computer system. As a result, the hardware of the data processing system may be shared across multiple users or multiple processes.

One example of a shared resource in a data processing system may be a network communication adapter. A network communication adapter allows a computer to communicate with other computers in a network, such as for example, over the Internet or an intranet. The communication adapter receives data from the computer system and transmits the data over the network. Similarly, the communication adapter may receive data from the network and provide the data to the computer system. In many modern layered data processing systems, the hardware of the communication adapter receives data from and provides data to the Dynamic Link Control (DLC) layer of the computer system.

Connections to the communications adapter generally fall into two categories: guaranteed bandwidth connections and best efforts connections. Guaranteed bandwidth connections result from negotiation between the DLC layer and the adapter to establish a guaranteed transmission rate for a connection through the adapter. Thus, for example, a connection may be establish through an adapter which guarantees a throughput of 1 megabyte of data per second. In a best efforts connection, the adapter utilizes whatever bandwidth is available to send the data. For example, if an adapter has a maximum throughput of 6 MB/sec. and 3 MB/sec. are allocated to guaranteed bandwidth connections, then on average 3 MB/sec. will be available for use by best efforts connections. However, with a best efforts connection there is no guarantee that any bandwidth of the adapter will be available for handling the connection's data.

The communications adapter includes data buffers which buffer the data which is transmitted to and received from the DLC by the communications adapter. These buffers may be used by multiple applications executing on the data processing system that use the communications adapter to communicate with the network, thus providing for multiple connections through the communications adapter. However, if more data is provided to the network communications adapter than may be buffered by the adapter, the adapter will typically discard the transmitted data. Thus, if the users or applications are using High Performance Routing (HPR), end-to-end error recovery of HPR will typically cause retransmission of the discarded data. This error recovery protocol, while providing for higher reliability, may cause reduced throughput of the adapter as bandwidth normally utilized by data communications is utilized for retransmitted data. It is, therefore, desirable to avoid the case where the buffers of the adapter are over-utilized.

An additional characteristic that may further complicate providing for both best efforts and guaranteed bandwidth connections is that the communications with the adapter may be "bursty" in that the data is not provided at a constant rate. If the peak of a burst of data is received from best efforts connection, then that data may over-utilize the adapter for a period of time. Because of the discontinuous nature with which data may be received by the communications adapter it may be possible for all of the buffers of the adapter to be filled by data for a best efforts communication. Therefore, the data from a guaranteed bandwidth communication may be rejected and the guaranteed bandwidth connection may not be provided with the required bandwidth. Furthermore, if a guaranteed bandwidth connection has a large amount of data to be carried by the adapter, the guaranteed bandwidth connection may dominate use of the adapter and, thereby, preclude use of other guaranteed bandwidth connections or best efforts connections. Thus, simply prioritizing the guaranteed bandwidth data may not prevent overrun of the adapter and may not provide a fair allocation of adapter usage among connections.

In light of the above discussion, a need exists for improvements in the control of data flow for guaranteed bandwidth connections.

SUMMARY OF THE INVENTION

In view of the above discussion, it is an object of the present invention to provide for improved performance of guaranteed bandwidth connections while maintaining fairness to best efforts connections.

A further object of the present invention is to provide for increased control over connections through a communications adapter to provide for fair sharing of resources.

Still a further object of the present invention is to provide for avoidance of buffer overruns in communication adapters.

Yet another object of the present invention is to provide for guaranteed bandwidth connections without requiring additional signals between a communications adapter and a device using the communications adapter to avoid buffer overrun at the adapter.

A still further object of the present invention is to automatically control adapter usage such that each connection through the adapter is properly allocated bandwidth of the adapter.

Another object of the present invention is to prevent the continued dominance of adapter bandwidth by any single connection such that guaranteed bandwidth connections are not satisfied or best efforts connections are excluded.

These and other objects of the present invention are provided by methods, systems (apparatus) and computer program products which control the data rate through a communications adapter having at least one guaranteed bandwidth connection through the communications adapter. The control of the data rate may be accomplished by assigning to the guaranteed bandwidth connection, a maximum threshold value proportional to the amount of data to be transmitted through the communications adapter in a time interval to satisfy the guaranteed bandwidth of the connection. The amount of data transmitted through the communications adapter for the guaranteed bandwidth connection may then be counted so as to provide a connection data count associated with the guaranteed bandwidth. Data transmissions to the communications adapter for data associated with the guaranteed bandwidth connection are suspended if transmission of the data would cause the connection data count to exceed the maximum threshold value assigned to the guaranteed bandwidth connection. A count of data transferred outbound to the communications adapter is also maintained so as to provide an outbound data count. Similarly, a count of data transferred outbound to and inbound from the communications adapter is maintained so as to provide a total data count. Transmission of data associated with non-guaranteed bandwidth connections is then suspended when one of the outbound data count exceeds an outbound data threshold or the total data count exceeds a total data threshold. The outbound data count and the total data count and the connection data count are reset after expiration of a time interval.

By controlling both the amount of guaranteed bandwidth data which may be transmitted to an adapter during a time interval, the present invention reduces the likelihood that a buffer overrun at the adapter would result from the transmission of guaranteed bandwidth data. Furthermore, by controlling the amount of best efforts data which may be sent to the adapter during the same time interval, the present invention balances the use of the adapter by best efforts connections with the need to provide the guaranteed bandwidth.

In particular embodiments of the present invention, the maximum threshold value of the guaranteed bandwidth connection is proportional to the amount of data to be transmitted through the communications adapter in a time interval to satisfy the guaranteed bandwidth of the connection based upon an amount of buffers allocated to the guaranteed bandwidth connection by the communications adapter, a time to transmit data to the communications adapter and a service time for data transmitted to the communications adapter once the data has reached the communications adapter. Furthermore, this information may be obtained from the communications adapter. Thus, the present invention provides for flexibility in the adapters which may be utilized with the present invention as the thresholds may be dynamically set for the adapter.

In another embodiment of the present invention, the maximum threshold value is revised so as to compensate for actual utilization of the guaranteed bandwidth connection during a previous time interval. This revision may be carried out by modifying the start counts of counters which track the data sent to the adapter for the guaranteed bandwidth connection. These counters may be incrementing or countdown counters.

Similarly, the outbound data threshold and the total data threshold values may be revised so as to compensate for actual utilization of the communications adapter during a previous time interval. The outbound data sent to the adapter and the total data through the adapter may be tracked by corresponding counters and the counter initialization values modified to compensate for actual usage in a previous time interval. Also, a data count of data transmitted from the communications adapter may be maintained for successive time intervals and averaged to provide an average transmitted data count. This average transmitted data count may then be used as the count of data inbound from the communications adapter to determine the total data count for the communications adapter.

Also, because the present invention may utilize an external time source the time interval may vary between successive time intervals. In such a case, the maximum threshold values may be assigned to compensate for variations in the time interval. These threshold values may be assigned by defining a default time interval associated with the guaranteed bandwidth connection upon which the maximum threshold value is based. The actual time interval between a previous occurrence of said resetting of the counters may then be determined and the maximum threshold value compensated proportional to the difference between the default time interval and the actual time interval. In a similar manner the outbound data threshold and the total data threshold may be compensated for variations in the time interval.

By adjusting for the variations in the time interval, in a subsequent time interval, the present invention increases the likelihood that the guaranteed bandwidth connections will achieve the desired average bandwidth for the two time intervals. Furthermore, by adjusting the total and outbound data thresholds the present invention provides for fair allocation of the adapter between the guaranteed bandwidth connections and the best efforts connections in the subsequent interval.

In a further embodiment of the present invention an indicator of the guaranteed bandwidth connection is placed in a restart connection queue if data for transmission to the communications adapter is suspended. A user of the guaranteed bandwidth connection is also notified that the connection is suspended. After resetting the counters to start the next time interval users of connections in the restart connection queue are notified that data may be transmitted to the communications adapter associated with the connections. The connection indicators are also removed from the restart connection queue.

In another embodiment of the present invention, the communication adapter segregates buffers resident on the communications adapter into a pool of buffers for guaranteed bandwidth connections and a pool of buffers for best efforts connections. It is also determined if a request for a connection through the communications adapter is a request for a guaranteed bandwidth connection. If sufficient guaranteed bandwidth buffers are not available for the requested guaranteed bandwidth connection the request is rejected. However, if sufficient guaranteed bandwidth buffers are available for the connection the request is accepted and the buffers in the guaranteed bandwidth buffer pool are allocated to the requested connection.

As will be appreciated by those of skill in the art, various aspects of the present invention may be utilized individually to control data rate to a communications adapter. For example, the outbound data count and the total data count may be utilized without the guaranteed bandwidth count to provide some level of control to prevent best efforts connections from over-utilizing the adapter to the detriment of guaranteed bandwidth connections. However, it is preferred that the present invention be utilized with both the per connection aspects of the present invention and the per adapter aspects of the present invention.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein with respect to flowchart illustrations of embodiments or aspects of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 1:
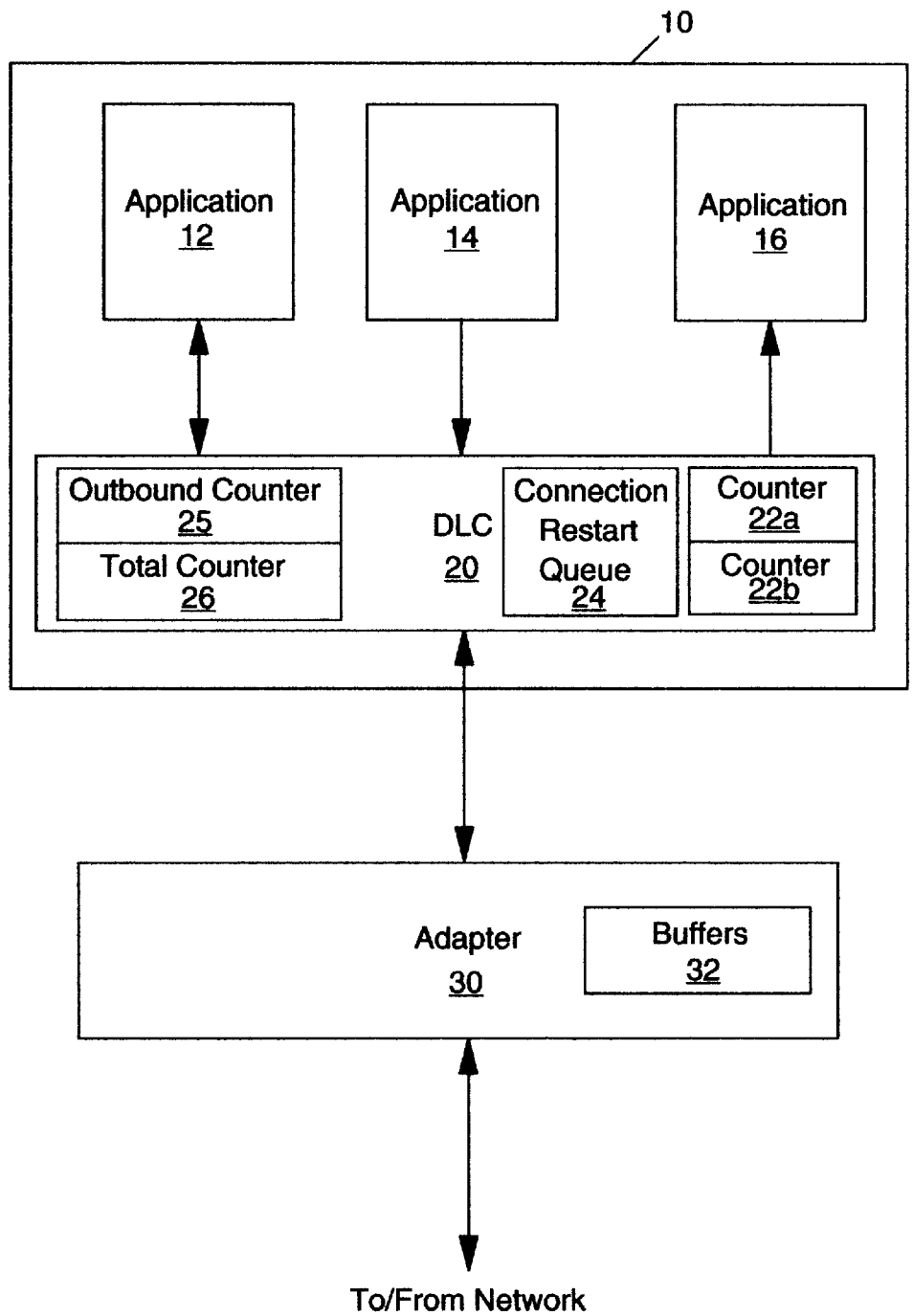
FIG. 1 is a block diagram of a data processing having a shared resource.

FIG. 1 illustrates one embodiment of the present invention in a communications environment. As seen in FIG. 1, a data processing system 10 has multiple concurrent applications 12, 14 and 16 executing on the processing system. These concurrent applications may take many forms known to those of skill in the art. Furthermore, these applications may be associated with a single user or multiple users of the data processing system 10. However, each of the applications 12, 14 and 16 may generate data to be transmitted by the communications adapter 30 or receive data which is transmitted to the communications adapter 30. This transmission and receipt of data is referred to herein as a "connection." Thus, each of the applications 12, 14 and 16 may be considered a user of the communications adapter 30. Accordingly, as used herein the term "user" refers to any software programs which establishes a connection through a communications adapter, including applications, procedures, operating systems, applets, device drivers, protocols layers or other software components known to those of skill in the art.

The data processing system 10 also has a DLC layer 20 which provides access to the communications adapter 30 to the applications 12, 14 and 16. As is illustrated in FIG. 1, the communications with the applications 12, 14 and 16 may be bi-directional (application 12), transmit only (application 14) or receive only (application 16).

The communications adapter 30 includes data storage devices such as registers, random access memory or the like which provide buffers 32 in which to store data for transmission by the communications adapter, either to the DLC layer 20 or to a network. Because the buffers 32 are finite in size, if too much data is received by the adapter 32, then the adapter discards the data. Communications adapters which may be utilized in the present invention include Open System Architecture (OSA) adapters.

The connections established between the DLC layer 20 and adapter 30 may be guaranteed bandwidth or best efforts connections. Methods of establishing both guaranteed bandwidth and best efforts connections through a communications adapter are known to those of skill in the art and need not be described herein.

FIG. 1 also illustrates maximum data counters 22a and 22b. The counters 22a and 22b are associated with guaranteed bandwidth connections using the DLC layer 20 and count the amount of data in a given interval of time which is transmitted to the adapter 30 for a guaranteed bandwidth connection.

FIG. 1 further illustrates a restart connection queue 24 in the DLC layer 20 of the data processing system 10. The restart connection queue 24 is utilized by the present invention to notify users of the restart of halted connections. Connections are placed in the restart connection queue when their corresponding counter indicates that the maximum amount of data for a time interval, the maximum threshold value, has been transmitted to the adapter 30. Connections are removed from the restart connection queue 24 when users of the connections are informed that the connection has been restarted.

An outbound data counter 25 and a total data counter 26 in the DLC layer 20 of the data processing system 10 are also illustrated in FIG. 1. The outbound data counter 25 counts the amount of data transferred to the adapter 30 by the DLC layer 20 for a given time interval. Similarly, the total data counter 26 counts the data transferred to the DLC layer 20 from adapter 30 and from the DLC layer 20 to the adapter 30 for the given time interval.

According to the present invention, an outbound data threshold is associated with the outbound data counter 25 such that if the threshold is exceeded, only guaranteed bandwidth data is transferred to adapter 30. A total data threshold is also associated with the total data counter 26 such that if the threshold is exceeded, only guaranteed bandwidth data is transferred to adapter 30. Accordingly, as will be appreciated by those of skill in the art, the counters 25 and 26 may be conventional counters which count up to the respective threshold values or they may be countdown counters which are initialized to the threshold values and then counted down as data is transferred to or from the adapter 30.

While the present invention is described herein with respect to two counters and two concurrent guaranteed bandwidth connections, as will be appreciated by those of skill in the art, more than two guaranteed bandwidth connections may be established for an adapter 30. Furthermore, the present invention need not be limited to data processing systems having a DLC layer 20 but may be utilized with any device communicating with a communications adapter which utilizes buffers and supports guaranteed bandwidth connections.

Figure 2:
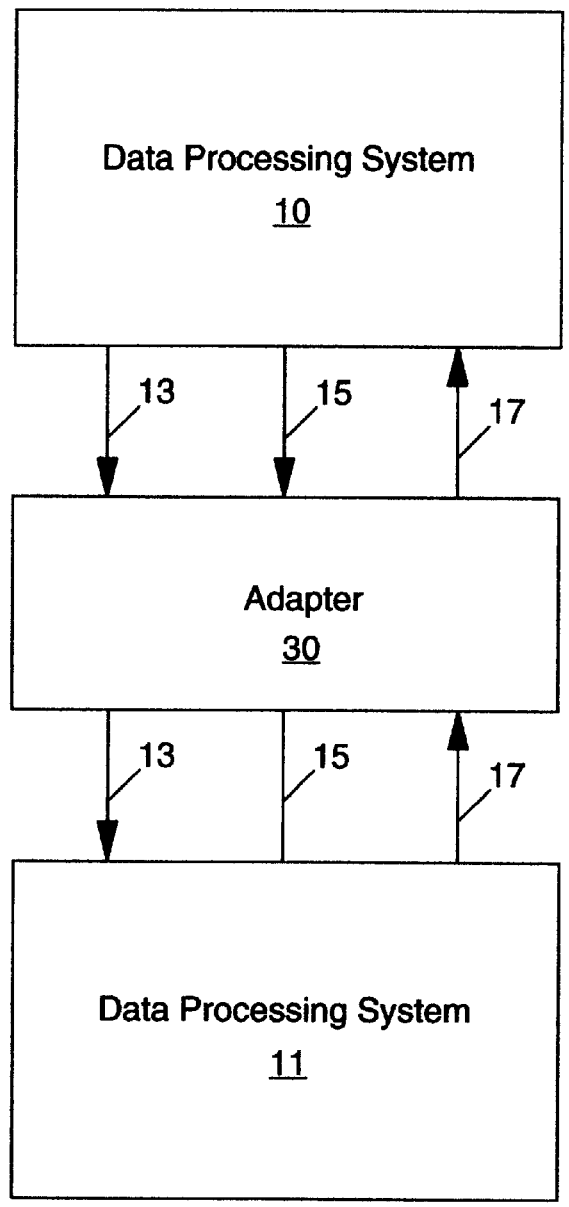
FIG. 2 is a block diagram of a communications adapter according to the present invention.

FIG. 2 illustrates a simplified network connection to illustrate the operations of the present invention. As seen in FIG. 2, a data processing system 10 has multiple connections 13, 15, and 17 with communications adapter 30. Similarly, data processing system 11 has corresponding connections 13, 15 and 17 to adapter 30 that allow communication with data processing system 10.

As illustrated in FIG. 2, for connections 13 and 15, data is transmitted from data processing system 10 and for connection 17 data is transmitted to data processing system 10. For purposes of example, connection 13 is a best efforts connection, connection 15 is a guaranteed bandwidth connection requiring 2.0 Mb/sec. bandwidth and connection 17 is also a guaranteed bandwidth connection requiring 2.0 Mb/sec. of bandwidth. Also, for purposes of illustration, adapter 30 provided for a maximum throughput of 6 Mb/sec.

If connection 13 is the first connection established begins transmitting data to adapter 30 connection 13 may utilize the entire bandwidth of adapter 30. Thus, for purposes of example, connection 13 may provide data to adapter 30 at a rate of 4 Mb/sec. When connection 15 is established as a guaranteed bandwidth connection, connection 15 will be able to utilize the remaining 2 Mb of capacity of adapter 30 and, thereby, meet its bandwidth requirements.

When connection 17 is started as a guaranteed bandwidth connection requiring 2 Mb/sec. of bandwidth, there is no remaining capacity for adapter 30 and so, in a conventional system, connection 17 would have to add its data to the mix of data sent to adapter 30, which would allow little if any data from connection 17 as the entire bandwidth of adapter 30 is utilized by connections 13 and 15, and, therefore, connection 17 would likely not achieve its guaranteed bandwidth.

However, according to the present invention, when either the total data count or the outbound data count exceeds the threshold values set for those counts, then only guaranteed bandwidth data would be allowed to be transmitted to adapter 30. Thus, connection 17 would be allowed to transmit data to adapter 30. Also, according the one embodiment of the present invention, if data is received by one guaranteed bandwidth connection in an amount equal to a guaranteed bandwidth threshold, the further data from that connection is not transmitted to the communications adapter 30.

Because the present invention compensates for underutilization of guaranteed bandwidth connections, during a time interval after connection 17 was prevented from fully utilizing the guaranteed bandwidth, the outbound and total counts would be adjusted to further curtail best efforts data to allow additional guaranteed bandwidth connections. Thus, for example, if in a first time interval of 0.1 seconds, best efforts connection 13 provided 400 kb of data, guaranteed bandwidth connection 15 provided 200 kb of data and guaranteed bandwidth connection 17 was prevented from providing data, then in the next time interval the threshold counts would be adjusted to allow 200 kb more of guaranteed bandwidth data from connection 17 as well as reducing the total data threshold and outbound thresholds by 200 Kb which effectively reduces the allowed amount of best efforts data by 200 Kb. Thus, in the next time interval connection 17 would be able to provide data to reach its guaranteed bandwidth. Accordingly, the present invention provides for fairness in distributing bandwidth of adapter 30 across both best efforts and guaranteed bandwidth connections.

Figure 3:
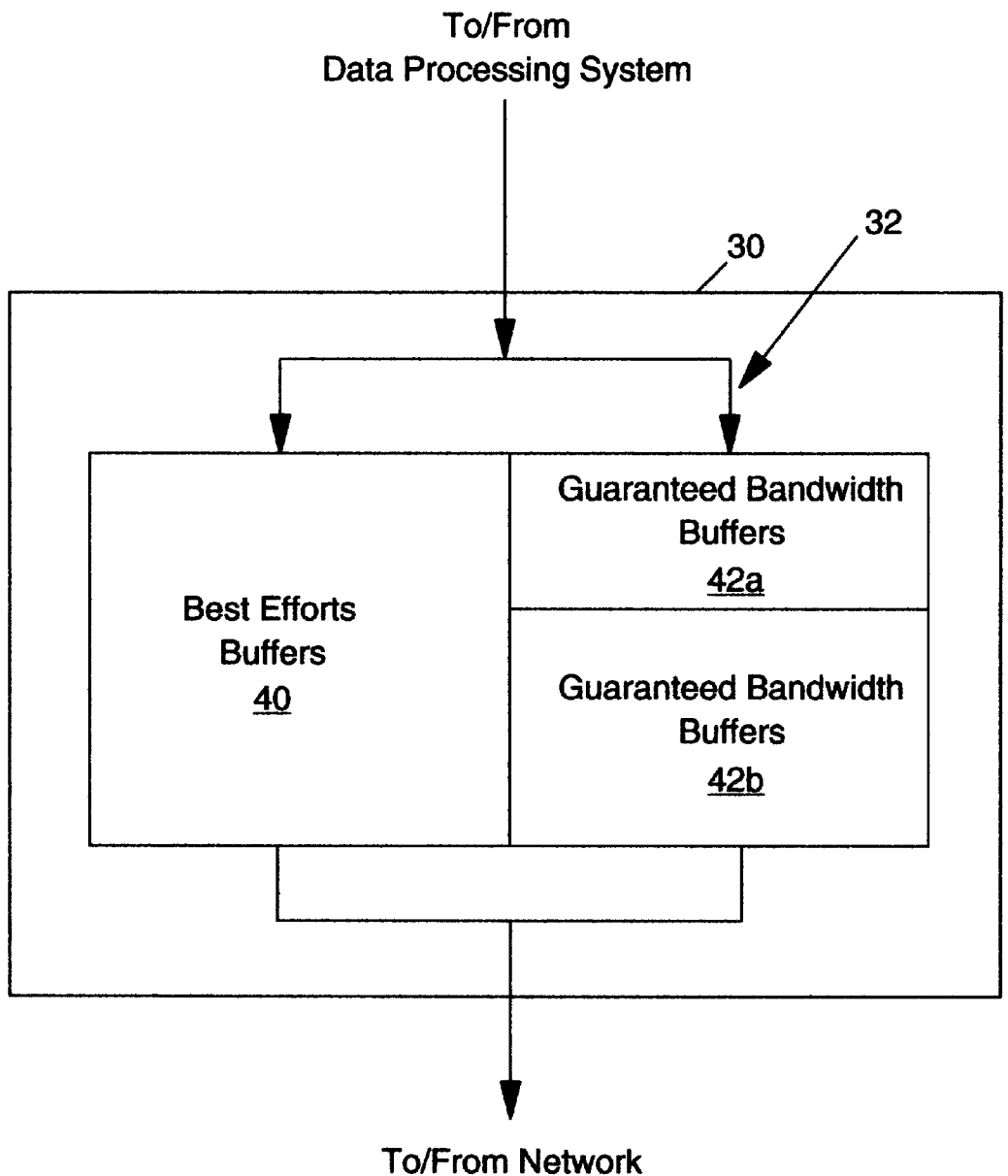
FIG. 3 is a flow chart illustration of the operation of an adapter utilizing one embodiment of the present invention.

FIG. 3 illustrates a communications adapter 30 and the allocation of buffers 32 within communications adapter 30 according to the present invention. As seen in FIG. 2, the buffers are allocated into two pools. One pool is allocated to guaranteed bandwidth connections 42a and 42b, and the remaining buffers 40 are allocated to best efforts connections. The size of the guaranteed bandwidth connections buffer pool is based upon the number of guaranteed bandwidth connections associated with the adapter 30. As seen in FIG. 2, the guaranteed bandwidth pool is illustrated as divided into two groups of buffers 42a and 42b. Thus, the first group 42a is associated with a first guaranteed bandwidth connection and the second group 42b is associated with a second guaranteed bandwidth connection through adapter 30.

For example, application 12 of FIG. 1 may require a guaranteed bandwidth connection of 1.5 MB/sec. Buffers 42a would be assigned by adapter 30 to the guaranteed bandwidth connection associated with application 12. Similarly, counter 22a in the DLC layer 20 may be associated with the guaranteed bandwidth connection. Application 14 may also require a guaranteed bandwidth connection which may be 2 Mb/sec. Buffers 42b and counter 22b would be allocated to the guaranteed bandwidth connection associated with application 14. Finally, application 16 may require a best efforts connection through adapter 30. The adapter 30 would then assign the best efforts buffers 40 to the connection associated with application 16. No counter is required for best effort communications.

In operation, the guaranteed bandwidth buffers 42a and 42b may expand and contract as needed. In fact, the guaranteed bandwidth buffers may even expand into the best efforts buffers if for a given interval the guaranteed bandwidth connection is over-utilized. However, the best efforts buffers 40 will not expand into the memory allocated for guaranteed bandwidth buffers as the guaranteed bandwidth buffers are reserved for guaranteed bandwidth connections. This one way expansion of the guaranteed bandwidth buffers further assures that the guaranteed bandwidth connections will not have data discarded by the communications adapter 30.

Figure 4:
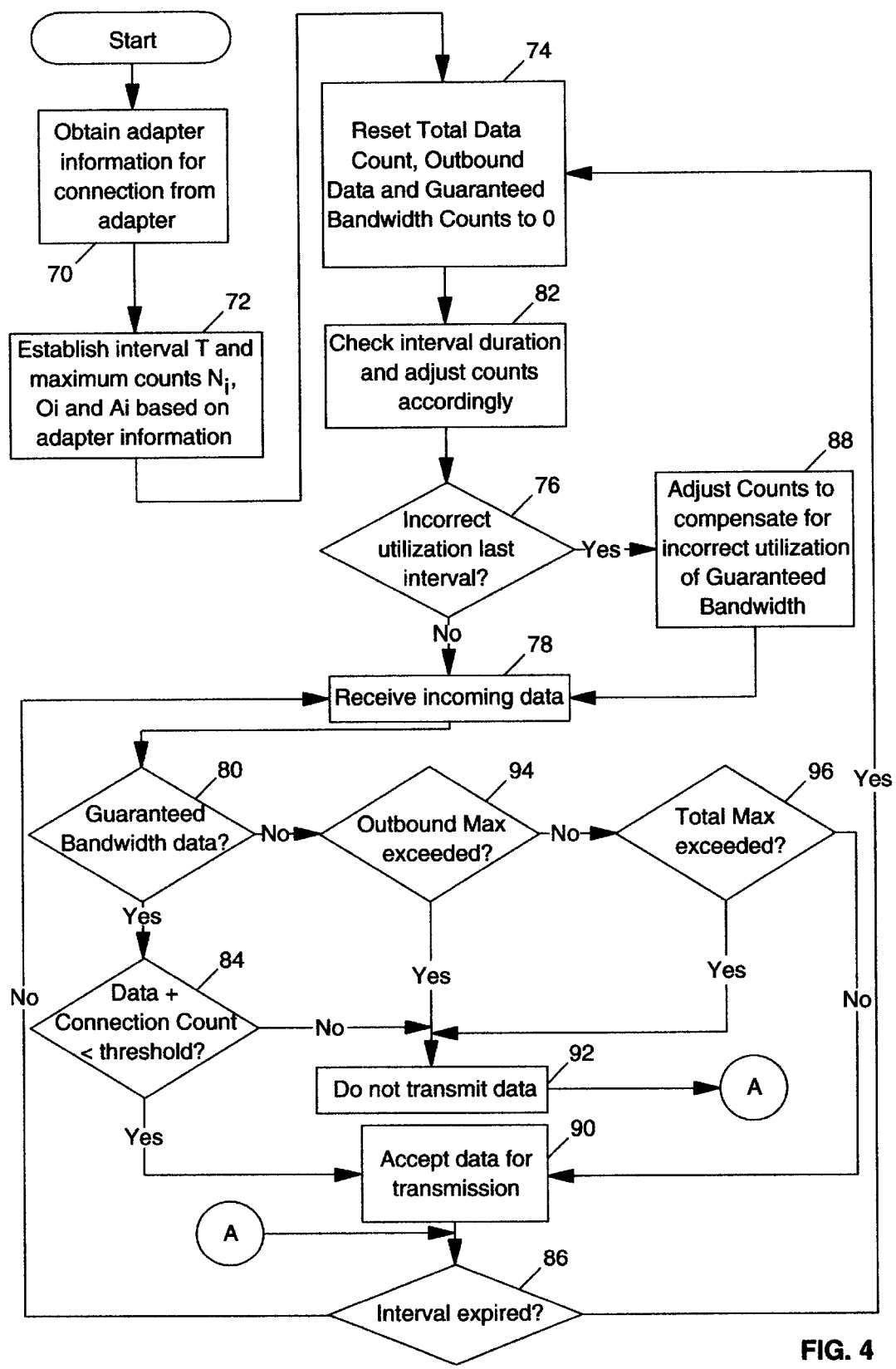
FIG. 4 is a flow chart illustration of the operation of a data processing system utilizing one embodiment of the present invention to communicate with a communications adapter.

Operation of one embodiment of the present invention will now be described with respect to FIG. 4, which illustrated the operations of the DLC layer 20 of FIG. 1. As seen in FIG. 4, the DLC layer 20 obtains adapter information (block 58 of FIG. 5) for the adapter 30 (block 70). In the OSA adapter example, when a data processing system is established as a user of OSA a signal called Activate SAP is sent to the adapter. On the reply to this request OSA provides the OSA transmit capacity and the total OSA capacity. This information may then be utilized as discussed below to establish the appropriate thresholds.

The adapter information, along with information on the time to transmit data to the adapter is then used to determine a timer value T which establishes a predefined time interval and a maximum data count for each guaranteed bandwidth connection $N_i$ where i is the $i^{th}$ guaranteed bandwidth connection (block 72). The maximum data count $N_i$ acts as a maximum threshold value. $N_i$ and T values are preferably selected based upon the amount of buffers allocated to the connection, the time to transmit data to the adapter and the service time for the data once it has reached the adapter. The interval T and the maximum data count $N_i$ are preferably selected so that the average queue length in the adapter (the amount of buffers used for the connection) does not exceed a specified percentage of the available buffers. Preferably, the same T values is utilized for each guaranteed bandwidth connection of an adapter. Furthermore, the value of T may be predefined in both the adapter 30 and the DLC layer 20. However, in such a case the flexibility to handle various adapters with differing amounts of memory may be reduced.

Similarly, the outbound data threshold $O_I$ and the total data thresholds $A_I$ are also established based upon the amount of buffers allocated to the connection, the time to transmit data to the adapter and the service time for the data once it has reached the adapter and the interval time T. The outbound data threshold is preferably established as the maximum rated outbound data throughput of the communications adapter for the interval T. The total data threshold is preferably established as the maximum rated inbound and outbound data throughput of the communications adapter for the interval T. While the outbound and total data thresholds are described herein as maximum values, as will be appreciated by those of skill in the art, a communications adapter may typically have a somewhat higher throughput than is specified by the rated maximums. Accordingly, despite the fact that the maximum amounts of data are provided to a communications adapter, it is typically possible to provide some finite amount of additional data to the adapter above these rated maximums.

After establishing the $N_i$, $O_i$, $A_i$ and T values, the DLC layer 20 resets the counters, such as counters 22a or 22b, associated with the guaranteed bandwidth connection to zero (block 74). The outbound data counter 25 and the total data counter 26 are also reset to 0 (block 74). The DLC layer 20 also notifies any users of connections in a connection restart queue 24 of the availability of the adapter for that connection (block 74). Such a notification may be made by transmitting a message, setting a flag, or providing a signal to indicate whether information is to be transmitted to the DLC layer for transmission to the adapter.

The DLC layer 20 also checks to see if a previous time interval has been expanded beyond T (block 82). An interval may be expanded or contracted as a result of variations in the timer utilized to measure the interval. The maximum count $N_i$, total data threshold $A_i$ and outbound data threshold $O_i$ may each be adjusted to compensate for the expansion or contraction of the previous interval by modifying the counts proportional to the difference between the actual interval and the expected interval. Thus, if the actual interval is 0.12 seconds and the expected interval was 0.1 seconds, then the counts may be increased by 20 percent. Such an increase may be accomplished by starting the counters 22a, 22b, 25 and 26 at a negative value or increasing the initialization value if the counters are countdown counters.

After notifying users and resetting the counts for the connection for a new interval, the DLC layer 20 tests to see if the adapter 30 was incorrectly utilized by a guaranteed bandwidth connection during the previous interval (block 76). An adapter 30 may be under utilized for any number of reasons including insufficient data supplied to the guaranteed bandwidth connection or over-utilization of the adapter 30 by best efforts connections early in an interval. Thus, for example, if the interval is established as 0.1 seconds and the guaranteed bandwidth connection is 1 Mb/sec., then if less than 100 kb of data were provided to the adapter 30 for the previous interval then the adapter 30 was under-utilized by the guaranteed bandwidth connection.

If the guaranteed bandwidth connection was incorrectly utilized for the previous interval, then the DLC layer 20 may compensate for the incorrect utilization of the connection by modifying the value of $N_i$ for the next interval (block 88). This modification may be accomplished by altering the start count of the guaranteed bandwidth connection count to reflect the incorrect utilization. For example, of $N_i$ is 100 kb and only 80 kb of utilization occurred in an interval, then the guaranteed bandwidth connection count would be reset to −20 kb to reflect the under-utilization. However, if less than 20 kb is utilized in the next interval the total under-utilization is not carried forward into the next interval. If the resultant count is a negative value after the next interval, the connection count is not altered in the following interval and the bandwidth is, thereby, increased by the amount the value is negative. Thus, the bandwidth of any one connection is limited to two times the threshold bandwidth for a given time interval. By compensating for under-utilization, the present invention better accommodates the bursty nature of the data transfer.

Similarly, if the guaranteed bandwidth connection was incorrectly utilized for the previous interval by any of the guaranteed bandwidth connections, then the DLC layer 20 may compensate for the incorrect utilization of the connection by modifying the values of $O_i$ and $A_i$ for the next interval (block 88). This modification may be accomplished by summing the over and/or under utilization of the guaranteed bandwidth connections and altering the start count of the total data counter 26 and outbound data counter 25 to reflect the incorrect utilization. For example, of $A_i$ is 600 kb and $O_i$ is 520 kb for an interval and the guaranteed bandwidth connections were under utilized by 80 kb for a previous interval, then the total data counter 26 and the outbound data counter 25 would both be reset to 80 kb to reflect the under-utilization. However, this compensation is not carried forward into the next interval unless less the guaranteed bandwidth connections were again incorrectly utilized. By increasing the start counts to the outbound and total counters for under-utilization of guaranteed bandwidth connections the DLC layer 20 reduces the mount of best efforts data which may be transmitted to the adapter 30 for an interval. This reduction in best efforts data frees up bandwidth for the guaranteed bandwidth data.

By compensating for under/over-utilization, the present invention better accommodates the bursty nature of the data transfer and provided for fairness between best efforts connections and guaranteed bandwidth connections.

After compensation for utilization errors or if no compensation is required, the DLC layer 20 receives the incoming data (block 78) and determines if the data is for a guaranteed bandwidth connection (block 80). If the data is not for guaranteed bandwidth, then, the data is for a best efforts connection and it is determined if transmission of the data would exceed the outbound data threshold (block 94). If transmission of the data would exceed the outbound data threshold, then the data is not transmitted to the adapter 30 (block 92). However, if transmission of the data would not exceed the outbound data threshold, then the DLC layer 20 determines if transmission of the data would exceed the total data threshold (block 96).

If transmission of the data would exceed the total data threshold, then the data is not transmitted to the adapter 30 (block 92). If transmission of the data would not exceed the total data threshold, then the data is accepted for transmission (block 90). In determining whether transmission of the data would exceed the total data threshold, the received component of the total data threshold may be the average of the data received from previous intervals and the data received during the current interval. Thus, the received component may be smoothed over multiple intervals to further reduce the impact of bursty connections. As will be appreciated by those of skill in the art, the total data count may be obtained by summing a received data count and the outbound data count. Thus, the averaging described above may be readily implemented as the received and outbound data counts may be separately maintained.

The DLC layer 20 then checks to see if the interval T has expired (block 86) and if not receives more data (block 78).

If the connection is a guaranteed bandwidth connection, the DLC layer 20 tests to see if the received data would cause the maximum count to be exceeded (block 84) for the connection. If so, the data is not transmitted to the communications adapter 30 and the connection is suspended and placed in the restart queue 24 (block 92). No further data will be transmitted to the adapter for this connection for the current interval. The user (application) may also be notified that the connection has been suspended by placing the connection in the restart queue 24. The user may be responsible for assuring that the data not sent to the communications adapter is retransmitted. Techniques for such retransmission are known to those of skill in the art. Alternatively, the DLC layer 20 may buffer the data for later transmission. If, however, the data does not cause the maximum count to be exceeded, then the data is accepted for transmission (block 90) and provided to the communications adapter 30.

As will be appreciated by those of skill in the art, the present invention provides for packets of data to be transmitted to the communications adapter 30 by the DLC layer 20. These packets of data are typically in a predefined size for a given connection. The fixed size nature of the data packets results in the possibility that the maximum data count may not fall on a packet boundary. For example, to a guaranteed bandwidth connection is a 1.5 Mb/sec. connection and the interval is 0.1 seconds, then the present invention would 150 Kb per interval to be transmitted for the connection. However, if the packet size is 4 Kb then the count will reach 148 Kb and the next packet will cause the maximum count to be exceeded. Preferably, the additional packet is not transmitted to the adapter and the count is not exceeded. However, if the additional packet is accepted and the count exceeded, on the next interval, the starting count for the connection may be adjusted to reflect the over-utilization of the connection on the previous interval and the start count could be set to 2 Kb to compensate for the additional data of the previous interval. Alternatively, the maximum threshold could be set to 148 Kb to compensate for the additional 2 Kb transmitted during the previous interval.

The DLC layer 20 then determines if the interval has expired (block 86). If the interval has expired, the count is reset and the users of the connections in the restart queue 24 are notified of the restart of the connection and that data will be received for those connections (block 74) and the subsequent operations are performed for the next interval. If the interval has not expired the operations from block 78 are repeated for the next incoming data.

Figure 5:
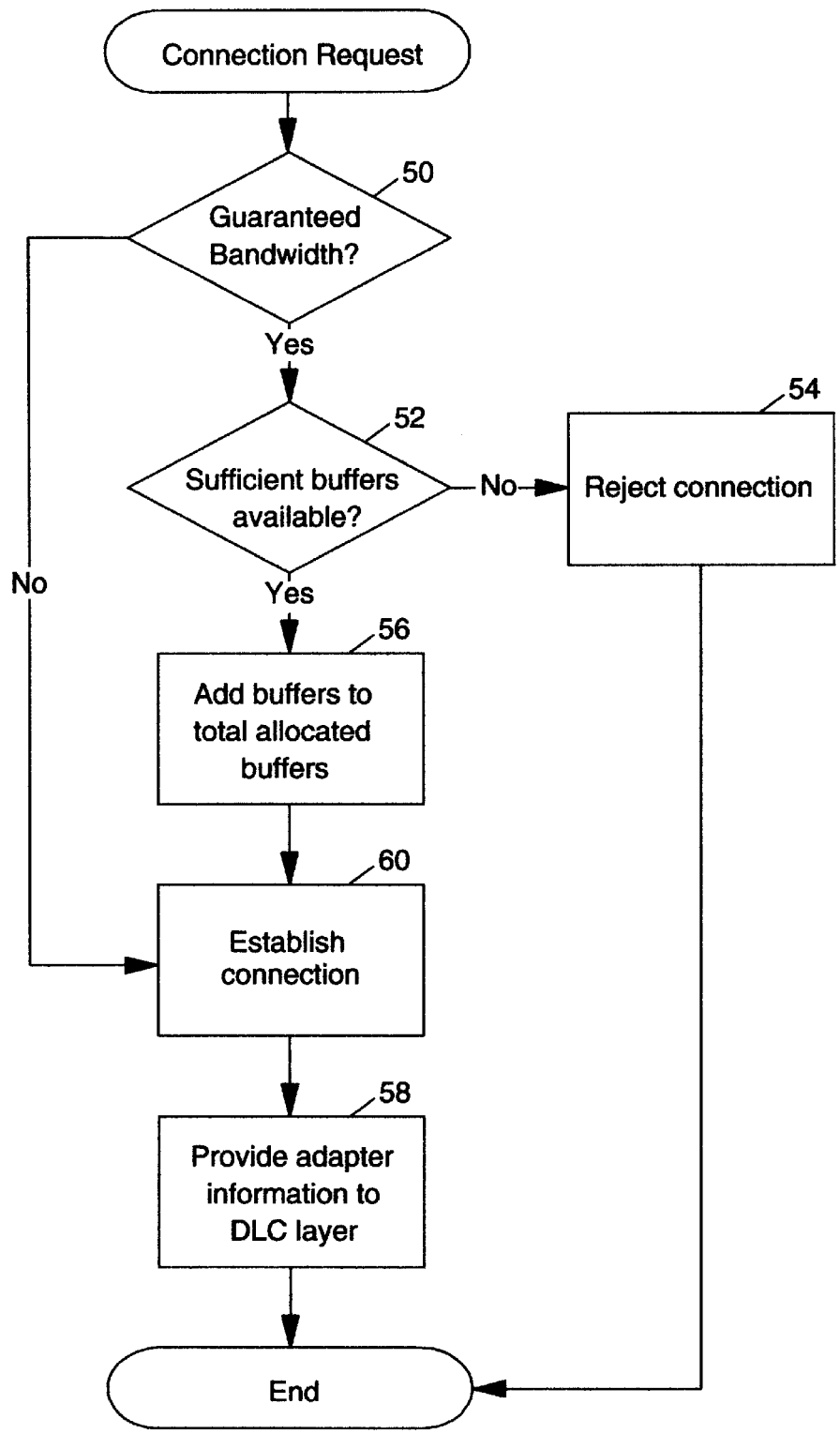
FIG. 5 is a flow chart illustration of operations of a communications adapter according to embodiments of the present invention.

FIG. 5 illustrates the operations of an adapter 30 according to the present invention. As seen in FIG. 5, when a request for a connection is received by adapter 30, the adapter checks to see if the request of for a guaranteed bandwidth connection (block 50). If the request is not for a guaranteed bandwidth connection, then the request is processed as a standard best efforts connection and the connection is established (block 60).

However, if the connection request is for a guaranteed bandwidth connection, the adapter 30 checks to see if sufficient buffers are available for the connection (block 52). For each guaranteed bandwidth connection the adapter 30 determines the amount of buffer space needed to hold the amount of data for a predetermined time interval (T) based on the guaranteed bandwidth of the connection. The amount of data required to be stored in the buffers may be expressed as B×T where B is the guaranteed bandwidth of the connection. The adapter 30 tracks the total amount of buffer space needed for all of its guaranteed bandwidth connections. When a request for a new guaranteed bandwidth connection is received by the adapter 30, the adapter 30 determines if sufficient unallocated reserved bandwidth buffer space is available to hold the B×T amount of data for the requested connection and if not, rejects the connection request (block 54).

The adapter 30 may allocate up to a maximum percentage of its total buffer space to guaranteed bandwidth connections. The adapter may then allocate buffers based upon the requested guaranteed bandwidth and the time interval T. For example, if a request requests a guaranteed bandwidth of 1 MB/sec., and the time interval is 0.1 seconds, then the adapter 30 may allocate one tenth of the bandwidth (B×T) or 100 kb of buffers to the requested connection.

If the adapter 30 determines that sufficient buffer space is available for the requested connection, then the adapter adds the buffers used for the connection to the total count of allocated buffers for the adapter (block 56). The adapter then establishes the connection (block 60). The adapter 30 also provides to the DLC layer 20 information about the buffer allocation of the adapter and the service time of the data after it reaches the adapter (block 58).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of controlling the data rate through a communications adapter having at least one guaranteed bandwidth connection through the communications adapter, the method comprising the steps of:

assigning to the guaranteed bandwidth connection, a maximum threshold value proportional to the amount of data to be transmitted through the communications adapter in a time interval to satisfy the guaranteed bandwidth of the connection;

counting the amount of data transmitted through the communications adapter for the guaranteed bandwidth connection so as to provide a connection data count associated with the guaranteed bandwidth;

suspending transmitting to the communications adapter, data associated with the guaranteed bandwidth connection if transmission of the data would cause the connection data count to exceed the maximum threshold value assigned to the guaranteed bandwidth connection;

maintaining a count of data transferred outbound to the communications adapter so as to provide an outbound data count;

maintaining a count both of data transferred outbound to and data transferred inbound from the communications adapter so as to provide a total data count;

suspending transmitting to the communications adapter, data associated with nonguaranteed bandwidth connections if transmission of the data would cause either the total data count to exceed a total data threshold value or the outbound data count to exceed an outbound data threshold and resetting the outbound data count and the total data count and the connection data count after expiration of a time interval.

2. A method according to claim 1, wherein said step of assigning comprises the steps of:

assigning to the guaranteed bandwidth connection, a maximum threshold value proportional to the amount of data to be transmitted through the communications adapter in a time interval to satisfy the guaranteed bandwidth of the connection based upon an amount of buffers allocated to the guaranteed bandwidth connection by the communications adapter, a time to transmit data to the communications adapter and a service time for data transmitted to the communications adapter once the data has reached the communications adapter.

3. A method according to claim 2, further comprising the step of obtaining an amount of buffers allocated to the guaranteed bandwidth connection by the communications adapter and a service time for data transmitted to the communications adapter once the data has reached the communications adapter from the communications adapter.

4. A method according to claim 1, further comprising the step of revising the maximum threshold value so as to compensate for actual utilization of the guaranteed bandwidth connection during a previous time interval.

5. A method according to claim 4, wherein said step of counting comprises incrementing a counter for each byte of data transmitted to the communications adapter and wherein said step of revising comprises the step of resetting the counter to a negative value equal to the amount of under-utilization of the guaranteed bandwidth connection during an immediately previous time interval.

6. A method according to claim 4, wherein said step of counting comprises decrementing a countdown counter initialized to the maximum threshold value for each byte of data transmitted to the communications adapter and wherein said step of revising comprises the step of increasing initialized value of the countdown counter by an amount equal to the under-utilization of the guaranteed bandwidth connection during an immediately previous time interval.

7. A method according to claim 1, wherein said time interval varies between successive time intervals and wherein said assigning step further includes the step of assigning maximum threshold values to compensate for variations in the time interval.

8. A method according to claim 7, wherein said step of assigning maximum threshold values to compensate for variations in the time interval comprises the steps of:

defining a default time interval associated with the guaranteed bandwidth connection upon which the maximum threshold value is based;

determining an actual time interval between a previous occurrence of said resetting step; and compensating the maximum threshold value proportional to the difference between the default time interval and the actual time interval.

9. A method according to claim 8, wherein said step of suspending transmitting data to the communications adapter for the guaranteed bandwidth connection further comprises the steps of:

placing an indicator of the guaranteed bandwidth connection in a restart connection queue if data for transmission to the communications adapter is suspended; and notifying a user of the guaranteed bandwidth connection that the connection is halted.

10. A method according to claim 9, wherein said resetting step further comprises the steps of:

notifying users of the connection in the restart connection queue that data may be transmitted to the communications adapter associated with the connection; and removing the connection indicator from the restart connection queue.

11. The method according to claim 1, wherein the communication adapter carries out the steps of segregating buffers resident on the communications adapter into a pool of buffers for guaranteed bandwidth connections and a pool of buffers for best efforts connections;

determining if a request for a connection through the communications adapter is a request for a guaranteed bandwidth connection;

determining if sufficient guaranteed bandwidth buffers are available for the requested guaranteed bandwidth connection;

rejecting the request for a guaranteed bandwidth connection if sufficient guaranteed bandwidth buffers are not available for the connection;

accepting the request for a guaranteed bandwidth connection if sufficient guaranteed bandwidth buffers are available for the connection; and allocating the buffers in the guaranteed bandwidth buffer pool to the requested connection if the requested connection is accepted.

12. A method according to claim 11, further comprising the step of notify a data processing system associated with the guaranteed bandwidth connection of the quantity of buffers allocated to the guaranteed bandwidth connection if the guaranteed bandwidth connection is accepted.

13. A method according to claim 1, further comprising the step of defining the outbound data threshold and the total data threshold based upon an amount of storage on the communications adapter, a time to transmit data to the communications adapter and a service time for data transmitted to the communications adapter once the data has reached the communications adapter.

14. A method according to claim 13, further comprising the step of obtaining the amount of storage on the communications adapter and the service time for data transmitted to the communications adapter once the data has reached the communications adapter from the communications adapter.

15. A method according to claim 1, further comprising the step of revising the outbound data threshold and the total data threshold values so as to compensate for actual utilization of the communications adapter during a previous time interval.

16. A method according to claim 15, wherein said step of maintaining a count of data transferred outbound to the communications adapter so as to provide an outbound data count comprises the step of incrementing a counter for each byte of data transmitted to the communications adapter;

wherein said step of maintaining a count of both data transferred outbound to and data transferred inbound from the communications adapter so as to provide a total data count comprises the step of incrementing a counter for each byte of data transferred outbound to or inbound from the communications adapter; and wherein said step of revising comprises the step of resetting the counter for outbound data count and the counter for total data count to negative values equal to the amount of under-utilization of the communications adapter during an immediately previous time interval.

17. A method according to claim 15, wherein said step of maintaining a count of data transferred outbound to the communications adapter so as to provide an outbound data count comprises the step of decrementing a countdown counter initialized to the outbound data threshold value for each byte of data transmitted to the communications adapter;

wherein said step of maintaining a count of both data transferred outbound to and data transferred inbound from the communications adapter so as to provide a total data count comprises the step of decrementing a countdown counter initialized to the total data threshold value for each byte of data transmitted to the communications adapter or received from the communications adapter; and wherein said step of revising comprises the step of increasing an initialized value of the countdown counter for the outbound data count and the countdown counter for the total data count by an amount equal to the under-utilization of the communications adapter during an immediately previous time interval.

18. A method according to claim 1, wherein said time interval varies between successive time, the method further comprising the step of compensating the outbound data threshold and the total data threshold for variations in the time interval.

19. A method according to claim 18, wherein said compensating step comprises the steps of:

defining a default time interval associated with the communications adapter upon which the outbound data threshold and the total data threshold values are based;

determining an actual time interval between a previous occurrence of said resetting step; and compensating the outbound data threshold and the total data threshold values proportional to the difference between the default time interval and the actual time interval.

20. A method according to claim 1, further comprising the steps of:

maintaining a data count of data transmitted from the communications adapter for previous time intervals;

averaging the count of data for previous time intervals to provide an average transmitted data count and wherein said step of maintaining a count of both data transferred outbound to and data transferred inbound from the communications adapter so as to provide a total data count utilizes the average transmitted data count as the count of data inbound from the communications adapter to determine the total data count for the communications adapter.

21. A method of controlling the data rate through a communications adapter, the method comprising the steps of:

maintaining a count of data transferred outbound to the communications adapter so as to provide an outbound data count;

maintaining a count of both data transferred outbound to and data transferred inbound from the communications adapter so as to provide a total data count;

suspending data transmission to non-guaranteed bandwidth connections if at least one of the outbound data count exceeds an outbound data threshold and the total data count exceeds a total data threshold; and resetting the outbound data count and the total data count after a time interval.

22. A method according to claim 21, further comprising the step of defining the outbound data threshold and the total data threshold based upon an amount of storage on the communications adapter, a time to transmit data to the communications adapter and a service time for data transmitted to the communications adapter once the data has reached the communications adapter.

23. A method according to claim 22, further comprising the step of obtaining the amount of storage on the communications adapter and the service time for data transmitted to the communications adapter once the data has reached the communications adapter from the communications adapter.

24. A method according to claim 21, further comprising the step of revising the outbound data threshold and the total data threshold values so as to compensate for actual utilization of the communications adapter during a previous time interval.

25. A method according to claim 24, wherein said step of maintaining a count of data transferred outbound to the communications adapter so as to provide an outbound data count comprises the step of incrementing a counter for each byte of data transmitted to the communications adapter;

wherein said step of maintaining a count of both data transferred outbound to and data transferred inbound from the communications adapter so as to provide a total data count comprises the step of incrementing a counter for each byte of data transferred outbound to or inbound from the communications adapter; and wherein said step of revising comprises the step of resetting the counter for outbound data count and the counter for total data count to negative values equal to the amount of under-utilization of the communications adapter during an immediately previous time interval.

26. A method according to claim 24, wherein said step of maintaining a count of data transferred outbound to the communications adapter so as to provide an outbound data count comprises the step of decrementing a countdown counter initialized to the outbound data threshold value for each byte of data transmitted to the communications adapter;

wherein said step of maintaining a count of both data transferred outbound to and data transferred inbound from the communications adapter so as to provide a total data count comprises the step of decrementing a countdown counter initialized to the total data threshold value for each byte of data transmitted to the communications adapter or received from the communications adapter; and wherein said step of revising comprises the step of increasing an initialized value of the countdown counter for the outbound data count and the countdown counter for the total data count by an amount equal to the under-utilization of the communications adapter during an immediately previous time interval.

27. A method according to claim 21, wherein said time interval varies between successive time, the method further comprising the step of compensating the outbound data threshold and the total data threshold for variations in the time interval.

28. A method according to claim 27, wherein said compensating step comprises the steps of:

defining a default time interval associated with the communications adapter upon which the outbound data threshold and the total data threshold values are based;

determining an actual time interval between a previous occurrence of said resetting step; and compensating the outbound data threshold and the total data threshold values proportional to the difference between the default time interval and the actual time interval.

29. A method according to claim 21, further comprising the steps of:
maintaining a data count of data transmitted from the communications adapter for previous time intervals;
averaging the count of data for previous time intervals to provide an average transmitted data count and wherein said step of maintaining a count of both data transferred outbound to and data transferred inbound from the communications adapter so as to provide a total data count utilizes the average transmitted data count as the count of data inbound from the communications adapter to determine the total data count for the communications adapter.

30. A system for controlling the data rate through a communications adapter having at least one guaranteed bandwidth connection through the communications adapter, comprising:
means for assigning to the guaranteed bandwidth connection, a maximum threshold value proportional to the amount of data to be transmitted through the communications adapter in a time interval to satisfy the guaranteed bandwidth of the connection;
means for counting the amount of data transmitted through the communications adapter for the guaranteed bandwidth connection so as to provide a connection data count associated with the guaranteed bandwidth;
means for suspending transmitting to the communications adapter, data associated with the guaranteed bandwidth connection if transmission of the data would cause the connection data count to exceed the maximum threshold value assigned to the guaranteed bandwidth connection;
means for maintaining a count of data transferred outbound to the communications adapter so as to provide an outbound data count;
means for maintaining a count of both data transferred outbound to and data transferred inbound from the communications adapter so as to provide a total data count;
means for suspending transmitting to the communications adapter, data associated with non-guaranteed bandwidth connections if transmission of the data would cause either the total data count to exceed a total data threshold value or the outbound data count to exceed an outbound data threshold value; and
means for resetting the outbound data count and the total data count and the connection data count after expiration of a time interval.

31. A system for controlling the data rate through a communications adapter, comprising:
means for maintaining a count of data transferred outbound to the communications adapter so as to provide an outbound data count;
means for maintaining a count of both data transferred outbound to and data transferred inbound from the communications adapter so as to provide a total data count;
means for suspending data transmission to non-guaranteed bandwidth connections if at least one of the outbound data count exceeds an outbound data threshold and the total data count exceeds a total data threshold; and
means for resetting the outbound data count and the total data count after a time interval.

32. A computer program product for controlling the data rate through a communications adapter having at least one guaranteed bandwidth connection through the communications adapter, comprising:
a computer-readable storage medium having computer-readable program code means embodied in said medium, said computer-readable program code means comprising:
computer-readable program code means for assigning to the guaranteed bandwidth connection, a maximum threshold value proportional to the amount of data to be transmitted through the communications adapter in a time interval to satisfy the guaranteed bandwidth of the connection;
computer-readable program code means for counting the amount of data transmitted through the communications adapter for the guaranteed bandwidth connection so as to provide a connection data count associated with the guaranteed bandwidth;
computer-readable program code means for suspending transmitting to the communications adapter, data associated with the guaranteed bandwidth connection if transmission of the data would cause the connection data count to exceed the maximum threshold value assigned to the guaranteed bandwidth connection;
computer-readable program code means for maintaining a count of data transferred outbound to the communications adapter so as to provide an outbound data count;
computer-readable program code means for maintaining a count of both data transferred outbound to and data transferred inbound from the communications adapter so as to provide a total data count;
computer-readable program code means for suspending transmitting to the communications adapter, data associated with non-guaranteed bandwidth connections if transmission of the data would cause the either the total data count to exceed a total data threshold or the outbound data count to exceed an outbound data threshold; and
computer-readable program code means for resetting the outbound data count and the total data count and the connection data count after expiration of a time interval.

33. A computer program product for controlling the data rate through a communications adapter, comprising: a computer-readable storage medium having computer-readable program code means embodied in said medium, said computer-readable program code means comprising:
computer-readable program code means for maintaining a count of data transferred outbound to the communications adapter so as to provide an outbound data count;
computer-readable program code means for maintaining a count of both data transferred outbound to and data transferred inbound from the communications adapter so as to provide a total data count;
computer-readable program code means for suspending data transmission to non-guaranteed bandwidth connections if at least one of the outbound data count exceeds an outbound data threshold and the total data count exceeds a total data threshold; and
computer-readable program code means for resetting the outbound data count and the total data count after a time interval.

34. A system according to claim 30, wherein said means for assigning comprises:
means for assigning to the guaranteed bandwidth connection, a maximum threshold value proportional to the amount of data to be transmitted through the communications adapter in a time interval to satisfy the guaranteed bandwidth of the connection based upon an amount of buffers allocated to the guaranteed bandwidth connection by the communications adapter, a time to transmit data to the communications adapter and a service time for data transmitted to the communications adapter once the data has reached the communications adapter.

35. A system according to claim 34, further comprising means for obtaining an amount of buffers allocated to the guaranteed bandwidth connection by the communications adapter and a service time for data transmitted to the communications adapter once the data has reached the communications adapter from the communications adapter.

36. A system according to claim 30, further comprising means for revising the maximum threshold value so as to compensate for actual utilization of the guaranteed bandwidth connection during a previous time interval.

37. A system according to claim 30, wherein said time interval varies between successive time intervals and wherein said means for assigning further comprises means for assigning maximum threshold values to compensate for variations in the time interval.

38. A system according to claim 37, wherein said means for assigning maximum threshold values to compensate for variations in the time interval comprises:
  means for defining a default time interval associated with the guaranteed bandwidth connection upon which the maximum threshold value is based;
  means for determining an actual time interval between a previous reset; and
  means for compensating the maximum threshold value proportional to the difference between the default time interval and the actual time interval.

39. A system according to claim 30, wherein the communication adapter further comprises:
  means for segregating buffers resident on the communications adapter into a pool of buffers for guaranteed bandwidth connections and a pool of buffers for best efforts connections;
  means for determining if a request for a connection through the communications adapter is a request for a guaranteed bandwidth connection;
  means for determining if sufficient guaranteed bandwidth buffers are available for the requested guaranteed bandwidth connection;
  means for rejecting the request for a guaranteed bandwidth connection if sufficient guaranteed bandwidth buffers are not available for the connection;
  means for accepting the request for a guaranteed bandwidth connection if sufficient guaranteed bandwidth buffers are available for the connection; and
  means for allocating the buffers in the guaranteed bandwidth buffer pool to the requested connection if the requested connection is accepted.

40. A system according to claim 31, further comprising means for defining the outbound data threshold and the total data threshold based upon an amount of storage on the communications adapter, a time to transmit data to the communications adapter and a service time for data transmitted to the communications adapter once the data has reached the communications adapter.

41. A system according to claim 40, further comprising means for obtaining the amount of storage on the communications adapter and the service time for data transmitted to the communications adapter once the data has reached the communications adapter from the communications adapter.

42. A system according to claim 31, further comprising means for revising the outbound data threshold and the total data threshold values so as to compensate for actual utilization of the communications adapter during a previous time interval.

43. A system according to claim 31, wherein said time interval varies between successive time, the system further comprising means for compensating the outbound data threshold and the total data threshold for variations in the time interval.

44. A system according to claim 43, wherein said means for compensating comprises:
  means for defining a default time interval associated with the communications adapter upon which the outbound data threshold and the total data threshold values are based;
  means for determining an actual time interval between a previous reset; and
  means for compensating the outbound data threshold and the total data threshold values proportional to the difference between the default time interval and the actual time interval.

45. A system according to claim 31, further comprising:
  means for maintaining a data count of data transmitted from the communications adapter for previous time intervals;
  means for averaging the count of data for previous time intervals to provide an average transmitted data count and
  wherein said means for maintaining a count of both data transferred outbound to and data transferred inbound from the communications adapter so as to provide a total data count utilizes the average transmitted data count as the count of data inbound from the communications adapter to determine the total data count for the communications adapter.

46. A computer program product according to claim 32, wherein said computer-readable program code means for assigning comprises:
  computer-readable program code means for assigning to the guaranteed bandwidth connection, a maximum threshold value proportional to the amount of data to be transmitted through the communications adapter in a time interval to satisfy the guaranteed bandwidth of the connection based upon an amount of buffers allocated to the guaranteed bandwidth connection by the communications adapter, a time to transmit data to the communications adapter and a service time for data transmitted to the communications adapter once the data has reached the communications adapter.

47. A computer program product according to claim 46, further comprising computer-readable program code means for obtaining an amount of buffers allocated to the guaranteed bandwidth connection by the communications adapter and a service time for data transmitted to the communications adapter once the data has reached the communications adapter from the communications adapter.

48. A computer program product according to claim 32, further comprising computer-readable program code means for revising the maximum threshold value so as to compensate for actual utilization of the guaranteed bandwidth connection during a previous time interval.

49. A computer program product according to claim 32, wherein said time interval varies between successive time intervals and wherein said computer-readable program code means for assigning further comprises compute-readable program code means for assigning maximum threshold values to compensate for variations in the time interval.

50. A system according to claim 48, wherein said computer-readable program code means for assigning maximum threshold values to compensate for variations in the time interval comprises:

computer-readable program code means for defining a default time interval associated with the guaranteed bandwidth connection upon which the maximum threshold value is based;

computer-readable program code means for determining an actual time interval between a previous reset; and computer-readable program code means for compensating the maximum threshold value proportional to the difference between the default time interval and the actual time interval.

51. A computer program product according to claim 32, further comprising:

computer-readable program code means for segregating buffers resident on the communications adapter into a pool of buffers for guaranteed bandwidth connections and a pool of buffers for best efforts connections;

computer-readable program code means for determining if a request for a connection through the communications adapter is a request for a guaranteed bandwidth connection;

computer-readable program code means for determining if sufficient guaranteed bandwidth buffers are available for the requested guaranteed bandwidth connection;

computer-readable program code means for rejecting the request for a guaranteed bandwidth connection if sufficient guaranteed bandwidth buffers are not available for the connection;

computer-readable program code means for accepting the request for a guaranteed bandwidth connection if sufficient guaranteed bandwidth buffers are available for the connection; and computer-readable program code means for allocating the buffers in the guaranteed bandwidth buffer pool to the requested connection if the requested connection is accepted.

52. A computer program product according to claim 33, further comprising computer-readable program code means for defining the outbound data threshold and the total data threshold based upon an amount of storage on the communications adapter, a time to transmit data to the communications adapter and a service time for data transmitted to the communications adapter once the data has reached the communications adapter.

53. A computer program product according to claim 52, further comprising computer-readable program code means for obtaining the amount of storage on the communications adapter and the service time for data transmitted to the communications adapter once the data has reached the communications adapter from the communications adapter.

54. A computer program product according to claim 33, further comprising computer-readable program code means for revising the outbound data threshold and the total data threshold values so as to compensate for actual utilization of the communications adapter during a previous time interval.

55. A computer program product according to claim 33, wherein said time interval varies between successive time, the computer program product further comprising computer-readable program code means for compensating the outbound data threshold and the total data threshold for variations in the time interval.

56. A computer program product according to claim 53, wherein said computer-readable program code means for compensating comprises:

computer-readable program code means for defining a default time interval associated with the communications adapter upon which the outbound data threshold and the total data threshold values are based;

computer-readable program code means for determining an actual time interval between a previous reset; and computer-readable program code means for compensating the outbound data threshold and the total data threshold values proportional to the difference between the default time interval and the actual time interval.

57. A computer program product according to claim 33, further comprising:

computer-readable program code means for maintaining a data count of data transmitted from the communications adapter for previous time intervals;

computer-readable program code means for averaging the count of data for previous time intervals to provide an average transmitted data count and wherein said computer-readable program code means for maintaining a count of data transferred outbound to or data transferred inbound from the communications adapter so as to provide a total data count utilizes the average transmitted data count as the count of data inbound from the communications adapter to determine the total data count for the communications adapter.

* * * * *

UNITED STATES PATENT AND TRADEMARK OFFICE
CERTIFICATE OF CORRECTION

PATENT NO.  : 6,122,289
DATED       : September 19, 2000
INVENTOR(S) : Brown et al.

It is certified that error appears in the above-identified patent and that said Letters Patent is hereby corrected as shown below:

In the Claims:

In column 12, line 67, please delete "threshold and" and substitute – threshold; and – therefor.

In column 14, lines 54-55, please delete "both data transferred outbound to and" and substitute --data transferred outbound to or--therefor.

In column 15, lines 4-5, please delete "both data transferred outbound to and" and substitute-- data transferred outbound to or--therefor.

In column 15, lines 41-42, please delete "both data transferred outbound to and" and substitute--data transferred outbound to or--therefor.

In column 17, lines 7-8, please delete "both data transferred outbound to and" and substitute--data transferred outbound to or--therefor.

In column 17, lines 36-37, please delete "both data transferred outbound to and " and substitute--data transferred outbound to or--therefor.

In column 18, line 29, please delete "both data transferred outbound to and " and substitute--data transferred outbound to or--therefor.

In column 18, lines 44-45, please delete the following paragraph format:
"a communications adapter, comprising: a computer readable storage medium " and substitute
--a communications adapter, comprising:
    a computer readable storage medium --therefor.

UNITED STATES PATENT AND TRADEMARK OFFICE
CERTIFICATE OF CORRECTION

PATENT NO. : 6,122,289
DATED : September 19, 2000
INVENTOR(S) : Brown et al.

Page 2 of 2

It is certified that error appears in the above-identified patent and that said Letters Patent is hereby corrected as shown below:

In column 20, lines 33-34, please delete "both data transferred outbound to and " and substitute --data transferred outbound to or--therefor.

Signed and Sealed this

Eighth Day of May, 2001

Attest:

NICHOLAS P. GODICI

Attesting Officer

Acting Director of the United States Patent and Trademark Office